Figure 1:
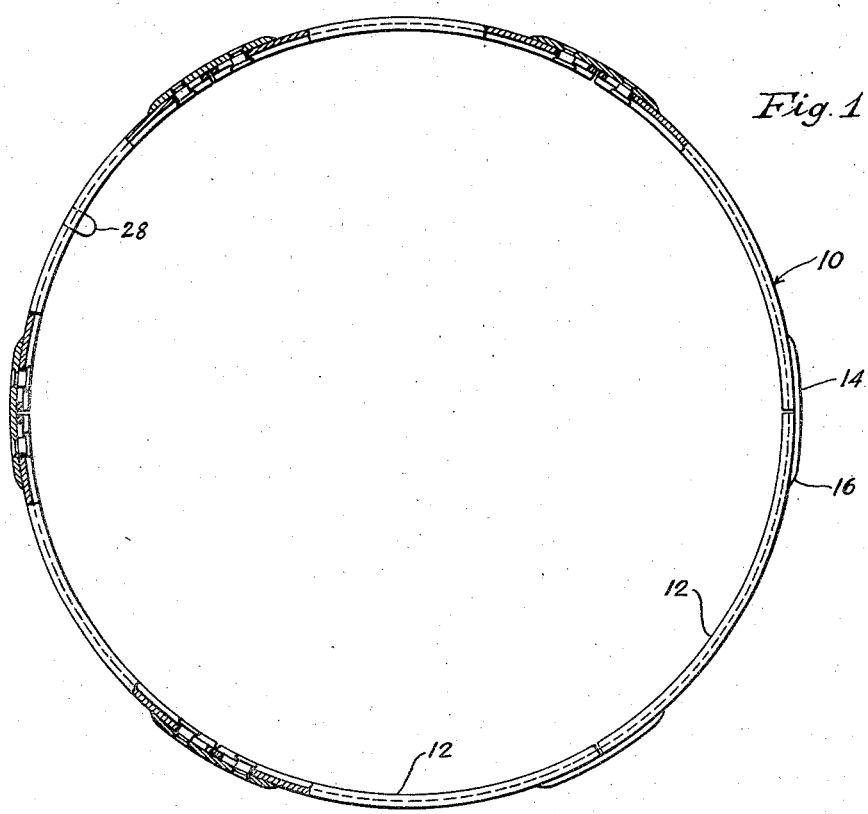

Inventor
Charles E. Zarth
By
Attorney

Oct. 15, 1946. C. E. ZARTH 2,409,410
BEAD LOCK RING AND ASSEMBLY
Filed July 3, 1942 3 Sheets-Sheet 2

Inventor
Charles E. Zarth
By
Attorney

Oct. 15, 1946.     C. E. ZARTH     2,409,410
BEAD LOCK RING AND ASSEMBLY
Filed July 3, 1942     3 Sheets-Sheet 3

Inventor
Charles E. Zarth
By
Attorney

Patented Oct. 15, 1946

2,409,410

UNITED STATES PATENT OFFICE 2,409,410

BEAD LOCK RING AND ASSEMBLY

Charles E. Zarth, Akron, Ohio, assignor to Wingfoot Corporation, Akron, Ohio, a corporation of Delaware Application July 3, 1942, Serial No. 449,601

5 Claims. (Cl. 152—400)

This invention relates to pneumatic tires and to bead locking means therefor, and, more particularly, is concerned with bead locking rings for positively securing an open beaded, straight sided tire, such as a combat tire, to a rim.

When a conventional open beaded, straight sided pneumatic tire is mounted on the usual rim and operated in conjunction with the standard inner tube, any blowout occurring in the tire often results in the tire separating from the rim or becoming so loose on the rim as to render further driving of the rim and tire impossible. Therefore, it has been proposed heretofore to provide means for locking the beads of the tire in association with the rim, but such proposed means have been relatively expensive, difficult to apply and remove, and have not met with acceptance commercially.

Further, it has been proposed to provide bead locking means in the form of ribs or buttons formed integral with the rim and over which the beads of the tire must move before being positioned upon the bead seats with the ribs or projections thereafter tending to hold the beads of the tire on the bead seats of the rim. However, bead locking means of this type, while possessing some merit for light tires, have been found to be unsatisfactory for heavy pneumatic tires, for example, combat tires, and do not adequately secure the beads of the tire to the rim, to say nothing of the difficulty of getting the beads of the tire over the ribs or projections and on to the bead seat.

It is the general object of my invention to avoid and overcome the foregoing and other difficulties of and objections to known forms of bead locking means by the provision of an improved, relatively inexpensive, easily operated and applied bead locking means to be employed in conjunction with pneumatic tires and standard base rims.

Another object of my invention is the provision of a pneumatic tire and rim combination including a new and improved and readily operated bead locking ring adapted to be held wedged between the beads of the tire at a point radially within the inextensible bead portions of the tire.

Another object of my invention is to provide bead locking means which are moved to bead locking relation by the pneumatic pressure inside of the tire.

Another object of my invention is the provision of an improved bead locking ring including a plurality of arcuate segments connected end to end in ring form by pivotal lost motion means.

The foregoing and other objects of my invention are achieved by the provision of a bead lock ring for use with open beaded, straight sided pneumatic tires and including a plurality of arcuate segments and means for connecting the segments end to end so as to permit expansion and contraction of the ring. The ring is positioned between the beads of the tire mounted on a rim having radially outwardly directed side flanges and the pneumatic pressure inside of the tire serves to move the ring down in wedged relation between the beads of the tire and to engage the beads against the side flanges of the rim.

Figure 5:
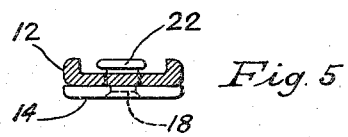
Figure 2:
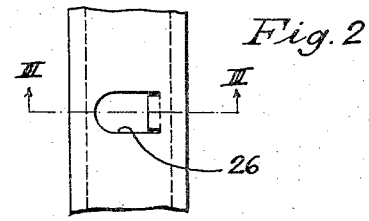
Figure 4:
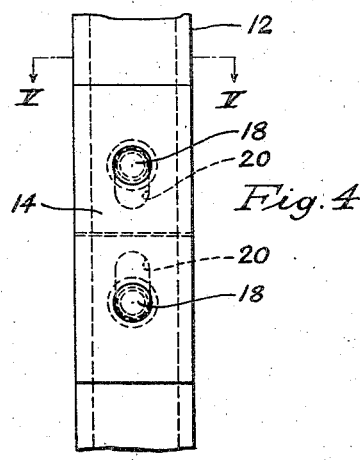
Figure 3:
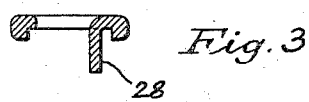
Figure 6:
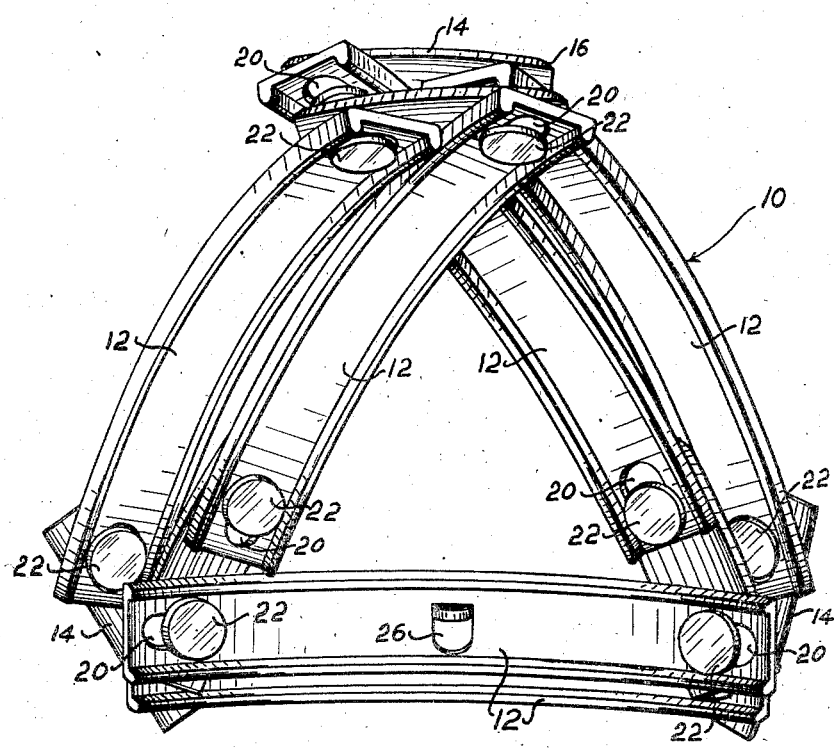
Figure 7:
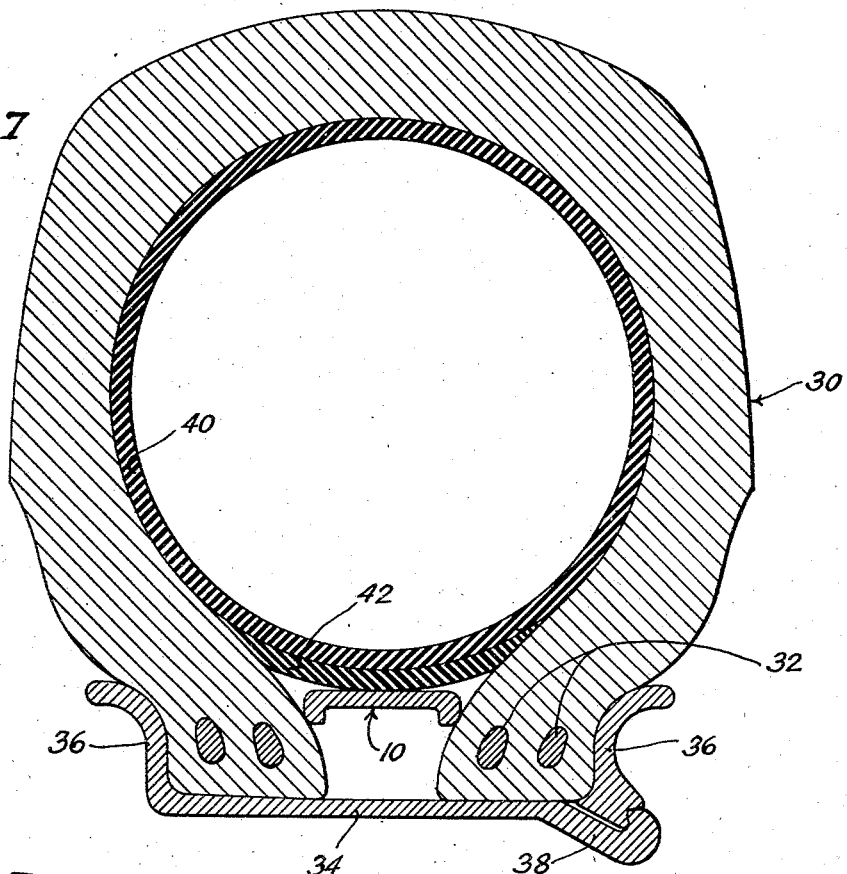
Figure 8:
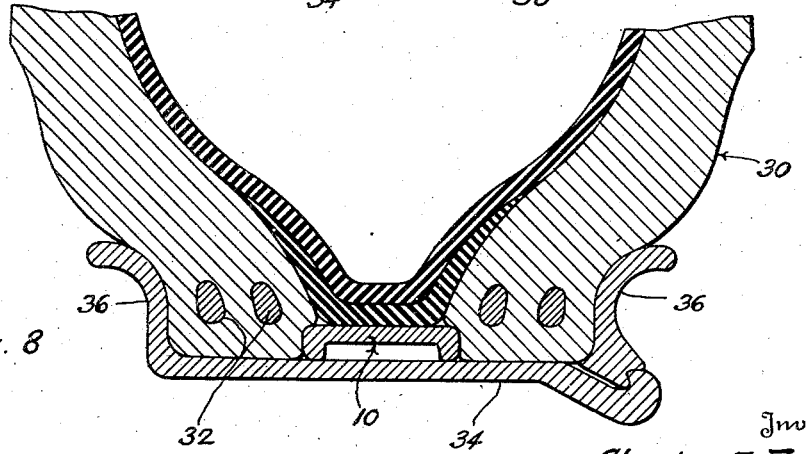

For a better understanding of my invention reference should be had to the accompanying drawings wherein Fig. 1 is a side elevation, partly in section, of a bead locking ring constructed in accordance with the principles of my invention; Fig. 2 is a fragmentary radial elevation of that portion of the locking ring including the valve stem hole and driving lug; Fig. 3 is a cross-sectional view taken on line III—III of Fig. 2; Fig. 4 is a fragmentary radial elevation of a portion of the locking ring illustrating the manner of connecting together the arcuate segments thereof; Fig. 5 is a cross-sectional view taken on line V—V of Fig. 4; Fig. 6 is a perspective view illustrating the manner in which the locking ring can be folded together to form a compact unit for shipment, handling, and the like; Fig. 7 is a cross-sectional view through a rim, tire and tube illustrating the positioning of the locking ring just prior to being moved into wedging relation with the beads of the tire; and Fig. 8 is a view similar to Fig. 7 but illustrating the position of the locking ring after it has been moved to the wedged locking position.

Referring to the drawings, the numeral 10 indicates generally one typical embodiment of a bead locking ring constructed in accordance with the principles of my invention. The bead locking ring includes a plurality of arcuate segments 12 each having substantially a channel shape in cross section and adapted to be joined end to end by lost motion pivotal means. Such means ordinarily comprise short arcuate plates 14 having beveled end portions 16. Each plate 14 has a countersunk opening in each end which receives the beveled head of a rivet 18 extending through a suitable slot 20 formed in the end of the arcuate segment 12, with each rivet 18 being provided with a flat head 22 which permits sliding and rotary movement of the arcuate segment 12 with respect to the plate 14 without separation of the parts.

I provide a valve hole 26 in one of the arcuate segments 12, as best seen in Fig. 2, and the valve hole 26 is formed by punching out and bending down a lug 28 in the arcuate segment which lug serves, if this be desired, as a driving lug between the ring 10 and any rim upon which the ring is mounted.

Fig. 6 of the drawings illustrates the manner in which the entire ring 10 can be folded into a relatively small compact assembly to facilitate the packing, shipping, or handling thereof. It will be noted from this figure of the drawings that the heads 22 of the rivets are received between the sides of the channels of the arcuate segments and that the plates 14 join the arcuate segments together for pivotal and lost motion movement so that the ring 10 is free to expand and contract to an amount limited by the movement of the rivets 18 in the slots 20.

In the use of the bead ring 10 of my invention, as particularly illustrated in Figs. 7 and 8 of the drawings, the numeral 30 indicates generally an open beaded, straight sided pneumatic tire of a combat type having a relatively heavy side wall and carcass portion including a considerably greater number of plies of rubberized fabric than the standard pneumatic tire. However, it will be understood that the bead locking ring of my invention may be employed in conjunction with the standard, conventional pneumatic tire.

The tire 30 includes inextensible wire bead reinforcements 32, which in the combat type of tire illustrated are generally spaced laterally of each other and are two in number for each bead of the tire. The pneumatic tire 30 is mounted upon a substantially standard metal rim 34 having radially outwardly directed side flanges 36, at least one of which may be removably received in a gutter portion 38 formed at one edge of the rim. Received within the pneumatic tire 30 is an inner tube 40, and a flap 42 is positioned between the inner tube 40 and the rim 34.

Also positioned between the inner tube 40 and the rim 34 is the bead locking range 10 of my present invention, and Fig. 7 of the drawings illustrates the position of the bead locking ring prior to inflation of the inner tube 40. In other words, Fig. 7 illustrates the position that the bead locking ring 10 takes during the assembly of the tire, tube, flap and lock ring on the rim 34. Once the tire 30 and the various parts thereof, as illustrated in Fig. 7, are completely mounted in position air under pressure is supplied to the interior of the inner tube 40 and this air under pressure forces the inner tube 40 and the flap 42 down against the upper surface of the bead locking ring 10 to wedge the bead locking ring down between the beads of the tire and into engagement with the rim 34, as particularly illustrated in Fig. 8. It will be seen from Fig. 8 that the bead locking ring 10 is positioned radially inwardly of the wire reinforcements 32 in the beads of the tire 30, and that the rubber of the beads has been deflected and wedged under considerable pressure by the bead locking ring 10 to hold the beads of the tire outwardly against the side flanges 36 of the rim in such a positive fashion that even though the pneumatic tire should suffer a blow-out or severe puncture the tire is so securely held on the rim 34 as to permit continued operation of the rim and tire as an integral unit.

The radially inward movement of the bead locking ring 10 from the position shown in Fig. 7 to that shown in Fig. 8 is possible due to the lost motion connections between the rivets 18 of the plates 14 and the slots 20 in the ends of the arcuate segments 12, as will be understood from the foregoing description.

When it is desired to remove the tire 30 from the rim 34 the side flange 36 of the rim which is received in the gutter 38 is removed from the gutter so that the entire tire 30, inner tube 40, flap 42, and bead locking ring 10 can be slid laterally off the rim 34.

From the foregoing it will be recognized that the various objects of my invention have been achieved by the provision of an improved bead locking ring and assembly particularly adapted for securing combat tires and the like to a base rim, and, generally providing improved, relatively-inexpensive, easily-operated positive means for securing an open beaded, straight sided tire to a rim. Although my invention is primarily adapted to operations in conjunction with standard rims of the type particularly illustrated and described above, it should be recognized that I may employ a bead locking ring of my invention in conjunction with other types of rims.

While in accordance with the patent statutes I have specifically illustrated and described one embodiment of my invention, it should be particularly understood that I am not to be limited thereto or thereby, but that the scope of my invention is defined in the appended claims.

What I claim is:

1. In combination, a substantially flat based rim having radially-outwardly directed side flanges, an open-beaded, straight-sided pneumatic tire mounted thereon, an inner tube mounted within the tire, a bead locking ring positioned between the beads of the tire, a flap between the ring and the inner tube, said tube being inflated to wedge the ring down between the beads of the tire and radially within the inextensible wire reinforcements of the beads and to engage the beads against the side flanges of the rim, said ring including a plurality of arcuate segments of channel-shaped cross section, arcuate plates bridging between the ends of the segments, and rivets secured to the arcuate plates and extending through slotted openings in the ends of the segments to provide pivotal lost motion connections between segments, and heads on the rivets received within the channel of the segments.

2. In combination, a substantially flat based rim having radially-outwardly directed side flanges, an open-beaded, straight-sided pneumatic tire mounted thereon, an inner tube mounted within the tire, a bead locking ring positioned between the beads of the tire, said tube being inflated to wedge the ring down between the beads of the tire and radially within the inextensible wire reinforcements of the beads and to engage the beads against the side flanges of the rim, said ring including a plurality of arcuate segments of channel-shaped cross section, arcuate plates bridging between the ends of the segments, and rivets secured to the arcuate plates and extending through slotted openings in the ends of the segments to provide pivotal lost motion connections between segments.

3. A bead lock ring for use with open-beaded, straight-sided pneumatic tires including a plurality of arcuate segments of channel-shaped cross section, arcuate plates bridging between the ends of the segments, rivets secured to the arcuate plates and extending through slotted openings in the ends of the segments to provide pivotal lost motion connections between segments, and heads on the rivets received within the channel shape of the segments.

4. A bead-locking device adapted when installed to retain the beads of a pneumatic tire upon its rim seat, comprising a plurality of arcuate segments united one to another by substantially rigid connectors, said connectors and segments having coacting means adapted to provide pivotal movement of one segment with respect to an adjacent segment, and relative circumferential movement between adjacent segments.

5. In combination, a flanged rim, a pneumatic tire having inextensible bead reinforcements therein mounted on the rim, an inner tube in said tire, and a bead-locking device for retaining the beads against the rim flanges, said bead-locking device embodying a plurality of rigid arcuate segments interconnected by rigid connectors to form an annulus and means coacting with said segments and connectors for providing pivotal movement between adjacent segments as well as relative circumferential movement between said segments.

CHARLES E. ZARTH.